No. 726,103. PATENTED APR. 21, 1903.
G. A. SCHACHT.
VEHICLE WHEEL HUB.
APPLICATION FILED OCT. 17, 1902.
NO MODEL.

Witnesses
Harry Luhrman
L. M. Jones

Inventor
Gustave A. Schacht,
by John Elias Jones,
his attorney.

UNITED STATES PATENT OFFICE.

GUSTAVE A. SCHACHT, OF CINCINNATI, OHIO, ASSIGNOR TO THE SCHACHT MANUFACTURING COMPANY, OF CINCINNATI, OHIO, A CORPORATION OF OHIO.

VEHICLE-WHEEL HUB.

SPECIFICATION forming part of Letters Patent No. 726,103, dated April 21, 1903.

Application filed October 17, 1902. Serial No. 127,616. (No model.)

*To all whom it may concern:*

Be it known that I, GUSTAVE A. SCHACHT, a citizen of the United States of America, and a resident of Cincinnati, in the county of Hamilton and State of Ohio, have invented certain new and useful Improvements in Vehicle-Wheel Hubs, of which the following is a specification.

This invention relates to certain improvements in hubs for vehicle-wheels, and has for its object to provide a hub of this general character of an improved and simplified nature and of a strong, light, and inexpensive construction which shall be adapted for use in connection with either solid or ball bearings, there being provided certain interchangeable parts capable of use for adapting the improved hub for employment in connection with either form of bearing.

The invention consists in certain novel features of the construction, combination, and arrangement of the several parts of the improved vehicle-hub whereby certain important advantages are attained and the device is made simpler, cheaper, and otherwise better adapted and more convenient for use than various other forms of hub heretofore employed, all as will be hereinafter fully set forth.

The novel features of the invention will be carefully defined in the claims.

Figure 1:
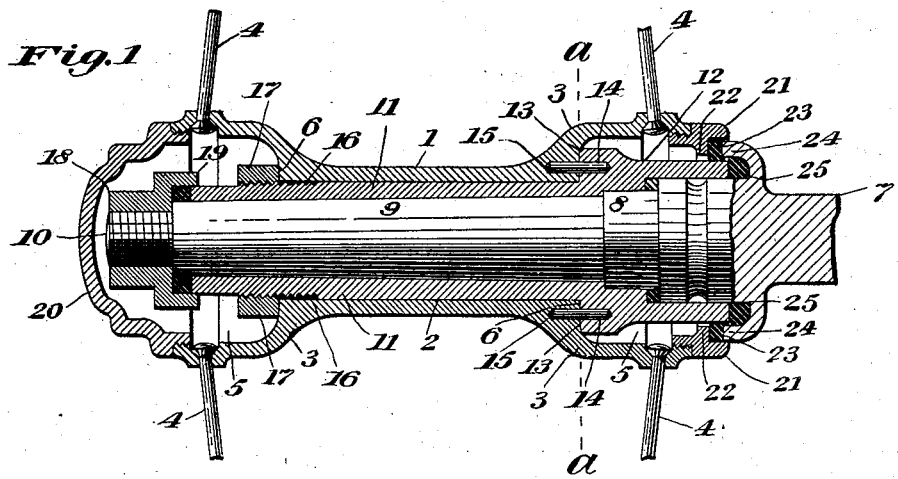
Figure 2:
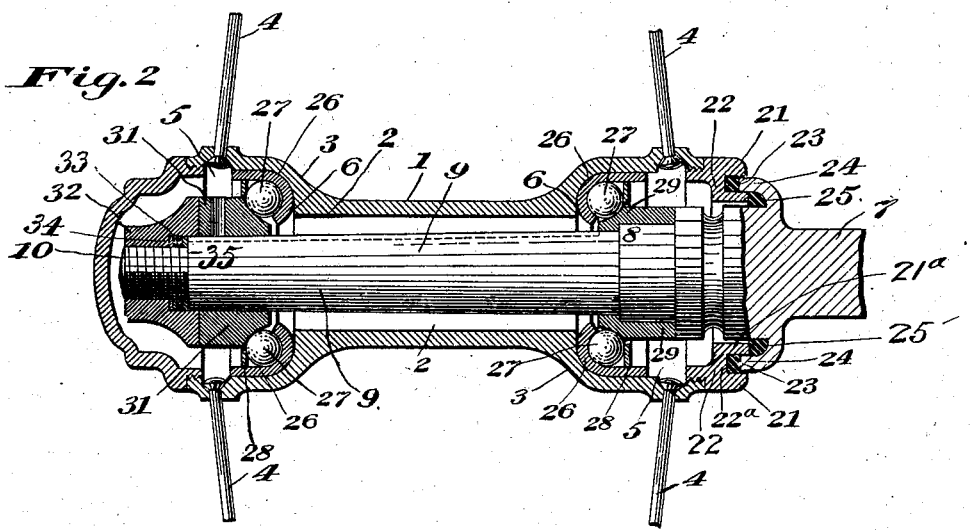
Figure 3:
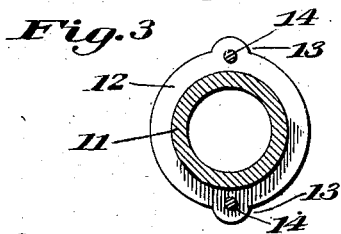

In the accompanying drawings, which serve to illustrate my improvements, Figure 1 is an axial section taken through a vehicle-hub constructed according to my invention and showing the same adapted for use in connection with a solid bearing; and Fig. 2 is a view similar to Fig. 1, but showing the improved hub adapted for use in connection with ball-bearings. Fig. 3 is a sectional view taken through the axle-sleeve employed in the construction shown in Fig. 1 and showing certain features of the means for holding said sleeve against turning in the hub, the plane of the section being indicated by the line *a a* in Fig. 1.

In the views, 1 indicates the central or body portion of the hub, which is formed with a central or axial bore or chamber 2, through which the end of the axle is designed to pass in the ordinary way.

3 3 indicate the ends of the hub, which are made enlarged and are provided with means for receiving the ends of the spokes 4 4, the chamber or bore of the hub being enlarged in diameter within said enlarged end portions, as indicated at 5 on the drawings. As herein shown, the hub is designed for use with metal spokes; but it will be evident that other spokes may also be used by modifying the structure in a well-known way. Owing to the increased diameter of the portions 5 5 of the interior chamber of the hub over that portion 2 of said chamber which is formed within the central body portion 1 of the hub it will be understood that shoulders 6 6 are formed in said end portions 5 5 and surrounding the ends of said reduced portion 2 of the bore or chamber.

7 indicates the axle, herein shown as provided with a tapered spindle 9 and provided at the inner end of said spindle 9 with enlargements 8, forming shoulders to prevent and limit movement of the hub inwardly upon the spindle. The smaller outer end of the spindle 9 is formed with a reduced screw-threaded portion 10, adapted to receive a nut, as will be hereinafter explained. The tapered spindle 9 of the axle is made of a diameter less than that of the bore 2 of the reduced central part 1 of the hub, and when it is desired to use the hub in connection with solid bearings I provide a sleeve 11, having a tapered bore formed to closely fit upon one end of the spindle 9, as shown in Fig. 1, but free for turning movement thereon, said sleeve 11 being made of an exterior diameter to fit within the central contracted portion 2 of the hub-chamber and having at its inner end an enlarged portion 12, the interior bore of which is formed to receive and fit snugly for turning movement upon the enlarged inner end portion 8 of the tapered axle-spindle 9.

At diametrically opposite sides the outer end surface of the enlarged portion 12 of the sleeve 11 is formed with lugs or projections 13 13, having sockets wherein are held pins or studs 14 14, the extremities of which project outward from said outer end of the enlarged portion 12 of the sleeve and are adapted to fit in recesses 15, produced in the shouldered surface 6 at that end of the hub. When the sleeve is slipped within the interior hollow of the hub, the said outer surface of the enlarged portion 12 of the sleeve will fit flush upon the said shouldered surface 6 at that end of the hub, so as to permit ready engagement of the pins or studs 14 in said recesses 15, and in this way it will be seen that the pins or studs serve to lock the sleeve against turning movement within the hub.

The outer end portion of the sleeve 11 is formed with exterior screw-threads, as shown at 16, and these threads are adapted for engagement with a nut 17, adapted to be screwed thereon within the outer enlarged end 5 of the interior chamber of the hub, as shown in Fig. 1 of the drawings, said nut when screwed on the sleeve serving to draw the sleeve endwise in the hollow of the hub, so that the pins or studs 14 shall be properly seated within the recesses 15 in the inner end portion of the hub. The nut 17 when screwed upon the sleeve has bearing upon the outer shouldered surface 6, as indicated in Fig. 1.

The smaller outer end of the tapered axle-spindle 9 is extended slightly beyond the outer end of the sleeve 11 when the parts are assembled as shown in Fig. 1, and upon the reduced and screw-threaded portion 10 at said outer end of the axle-spindle is adapted to be screwed a nut 18, having upon its inner face an annular flange 19, adapted to extend inwardly over the outer end of the sleeve and forming within it a chamber in which is placed a ring of suitable antifriction material.

The outer end of the hub is closed by a dust-cap 20, the edge portion of which is screw-threaded and fits corresponding threads inside the outer enlargement 3 of the hub, and in order to provide a close joint at the inner end of the hub to exclude dust I provide an annular dust-band 21, formed with screw-threads fitting a corresponding screw-threaded surface inside the inner enlarged end portion 3 of the hub and provided with an inwardly-extended flange 22, whereon is seated a packing 23, a bent or overhanging flange 24 on the axle serving to hold the said packing in place to exclude dust at the inner end of the spindle.

25 indicates a second packing inserted between the inner end of the enlarged portion 12 of sleeve 11 and the flange 24 on the axle for a similar purpose.

By removing the nuts 17 and 18 at the outer end of the sleeve 11 and spindle 9 the said sleeve and spindle may be removed from the hub, and when desired the solid bearing above described may be replaced by a ball-bearing, Fig. 2, the construction of the hub being such as to permit the replacing of sleeve 11 by the balls, cones, and races required for such a bearing. In changing the hub from a solid to a ball bearing, sleeve 11 and nut 17 are omitted, and in the enlarged portions 5 5 at the ends of the interior chamber of the hub are arranged races 26 26, Fig. 2, the structure being such that said races are securely held within the said enlarged portions 5 5, abutting upon the shouldered surfaces 6 6 at the ends of the contracted central bore 2 of the hub.

27 27 indicate the balls, arranged in the races 26, and 28 28 indicate retainers for holding the series of balls against displacement.

29 indicates a cone held upon the enlarged inner end portion 8 of the axle-spindle in position for engagement with the balls 27 of the inner race 26, and 31 indicates a cone held at the outer end of the axle-spindle and designed for engagement with the balls of the outer race 26.

32 indicates a nut on the reduced end portion 10 of the spindle for holding the parts in relation.

33 indicates a laminar packing inserted on the outer threaded end of the spindle 9 in the chamber 34 of nut 32 and bearing against the shoulder 35 at said outer end of the spindle to provide for the proper adjustment of the cone 31 in connection with the balls 27, one or more of the packing-rings or washers being readily removed or inserted to allow for more or less play of said balls in the race 26.

By the construction of the improved hub as above described it will be evident that the same may be used with equal facility for either solid or ball bearings, so that the hub may be readily converted from one form of bearing to the other by merely removing the sleeve and inserting the corresponding parts of the ball-bearing, or vice versa, by removing the parts of the ball-bearing and substituting sleeve 11 therefor. It will be therefore readily seen that the improved hub is especially well adapted for use, since either style or form of bearing may be had by simple substitution of the parts.

In said Fig. 2 I have shown a modified form of the dust-band 21 for excluding dust at the inner end of the spindle 9. In this construction the packing 23, whereon the overhanging flange 24 of the axle is engaged, is held within an annular groove $22^a$, formed in the surface of said band between an outwardly-turned flange $21^a$ and band 21, said flange $21^a$ engaging the packing 25 under said overhanging flange 24.

From the above description of my improvements it will be seen that the hub constructed according to my invention is of an extremely simple and inexpensive nature and is especially well adapted for use by reason of the facility with which it may be changed from one form of bearing to another, and it will also be obvious from the above description that the device is capable of some modifications without material departure from the principles and spirit of the invention, and for this reason I do not wish to be understood as limiting myself to the precise form and arrangement of the several parts herein set forth.

Having thus described my invention, what I claim, and desire to secure by Letters Patent, is—

1. A hub for vehicle-wheels comprising a cylindrical body portion having enlarged end portions and formed with a bore or chamber extended through it for the passage of an axle-spindle, the end portions of said chamber being made enlarged in diameter within the enlarged ends of the hub, and being formed with shouldered surfaces surrounding the ends of the contracted central portion of the chamber, a sleeve extended through the contracted central portion of said chamber and formed at one end with an enlargement arranged within one enlarged end portion of said chamber and provided with devices having engagement with the shouldered surface of said end portion for holding said sleeve against turning movement relatively to the hub, the opposite end of said sleeve being extended within the other end portion of the chamber within the hub and having screw-threads, a nut screwed on said threaded end of the sleeve and having engagement with the shouldered surface of the end portion of the hub-chamber wherein it is arranged, said sleeve being formed with a tapered bore, an axle-spindle having a tapered portion extended within the tapered bore of the sleeve and having an enlarged end portion arranged within the bore of the enlarged end of the sleeve and a nut screwed on the smaller end of the said spindle, substantially as set forth.

2. In a hub for vehicle-wheels, the combination of a body portion having enlarged ends and formed with a chamber extended through it and made in reduced diameter at the central part of the hub and enlarged in diameter at the end portions of the hub, the enlarged end portions of the chamber being formed with shouldered surfaces surrounding the ends of the central contracted portion of the chamber and one of said shouldered surfaces being provided with oppositely-arranged recesses, a sleeve having an enlarged end portion arranged in the end portion of the hub-chamber whose shouldered surface has the opposite recesses, said enlarged end of the sleeve having oppositely-arranged projections engaged within the recesses of said shouldered surface, the body portion of the sleeve being extended through the contracted central portion of the hub-chamber and being screw-threaded and extended within the enlarged end of said chamber at the opposite end of the hub, a nut screwed on the threaded end of the sleeve and arranged to bear on the shouldered surface at the end portion of the hub-chamber wherein it is arranged, an axle-spindle having a tapered portion extended through the body portion of the sleeve, an enlarged portion within the enlarged portion of the sleeve and a smaller end portion extended beyond the screw-threaded end of the sleeve and a nut screwed on said extended end of the spindle, substantially as set forth.

3. A hub for vehicle-wheels comprising a contracted central portion formed with an axial bore and enlarged end portions formed with enlarged chambers communicating with said bore and having shouldered surfaces surrounding the ends thereof, one of said shouldered surfaces being formed with oppositely-arranged recesses, a sleeve passed through the bore of the central part of the hub and having at one end oppositely-arranged projections provided with sockets, pins in said sockets and having protruding ends engaged in the recesses of the shouldered surface at that end of the hub, said sleeve being formed with a tapered axial bore and having its opposite end screw-threaded, a nut screwed on the threaded end of the sleeve and adapted for engagement with the shouldered surface at the opposite end of the hub, an axle-spindle having a tapered portion extended in the tapered bore of the sleeve, an enlarged portion in the enlarged end of the sleeve and an opposite end portion extended beyond the threaded end of the sleeve and a nut screwed on said extended end of the spindle, substantially as set forth.

Signed at Cincinnati, Ohio, this 9th day of October, 1902.

GUSTAVE A. SCHACHT.

Witnesses:
HENRY LUHRMAN,
JOHN ELIAS JONES.